Sept. 7, 1965 G. JOWIEC ETAL 3,205,314

TRUNK CIRCUIT

Filed Sept. 30, 1960 4 Sheets-Sheet 1

INVENTORS.
GEORGE JOWIEC
BY WILLIAM W. PHARIS
George W. Killian
AGENT

Sept. 7, 1965 G. JOWIEC ETAL 3,205,314

TRUNK CIRCUIT

Filed Sept. 30, 1960 4 Sheets-Sheet 2

United States Patent Office 3,205,314
Patented Sept. 7, 1965

3,205,314
TRUNK CIRCUIT

George Jowiec and William W. Pharis, Rochester, N.Y., assignors to General Dynamics Corporation, Rochester, N.Y., a corporation of Delaware Filed Sept. 30, 1960, Ser. No. 59,623
5 Claims. (Cl. 179—27)

This invention relates in general to automatic telephone systems and, more particularly, to the operation of private branch exchanges.

Although the invention herein disclosed is suitable for more general application, it is particularly adapted for use in automatic telephone systems serving business establishments. Such a telephone system is commonly known as a private branch exchange or, more conveniently, as a PBX. In these systems it is customary to provide special services and features which are not available to residential subscribers of telephone services through their telephone exchange. For example, if a call has been extended to a telephone extension within a PBX from outside the PBX, the recipient of the call may wish to have the call transferred to some other PBX extension. The transfer is usually initiated by the recipient of the call operating his hookswitch to transmit a supervisory signal to the PBX operator who responds thereto and transfers the call as may be directed. The techniques and facilities for accomplishing the transfer of a call from one PBX station to another when the original call was completed by a PBX operator, are old and well known within the art. However, the advent of operator and subscribed toll dialing, together with the speed and efficiency with which such calls are handled, has made it desirable to provide equipment at PBX's which permit subscribers and/or toll operators to dial directly to a PBX extension when the desired extension number is known by the calling subscriber. When a call has been completed to a PBX extension in response to the directive impulses without the assistance of a PBX operator, the time honored and well known techniques for accomplishing transfer of calls cannot be used.

Accordingly, it is the general object of this invention to provide a new and improved private branch exchange.

It is a more particular object of this invention to provide a new and improved means for transferring calls from one PBX extension to another PBX extension.

Another object of this invention is to provide a transfer means which is amenable to any number of transfers.

Another object of this invention is to provide a transfer means which employs the services of an operator but which, when completed, does not require the use of an operator's cord circuit.

Another object of this invention is to provide means for an inward dialed call to signal a PBX operator without employing the local PBX switching circuits.

In accordance with the present invention, an inward dialing and transfer trunk is connected to the PBX end of a trunk line extending between a central office and a PBX. In response to the seizure of the trunk line from the central office, the inward dialing and transfer trunk at the PBX seizes local PBX switching circuits for extending a call directly to any desired PBX extension as determined by the directive impulses from the central office. If the directive impulses indicate that it is desired to signal the PBX operator, rather than a particular PBX extension, the inward dialing and transfer trunk circuit releases the seized local PBX switching circuits and operates a signal device at the operator's position in response to the receipt of the appropriate number of digits.

A call which is first directed to the PBX operator may, in response to directive impulses from said operator's position, be extended to any desired PBX extension through the inward dialing and transfer trunk circuit and the local PBX switching circuits. A three way transmission connection between the trunk line, the desired PBX extension and the PBX operator, is completed when the PBX party answers. In response to the disconnect of the operator's circuit, a two way transmission connection is completed between the central office and the PBX party. Secrecy is assured as the PBX operator is prevented from re-entering the circuit until the PBX party has flashed to originate a transfer.

If an incoming trunk call is extended, by directive impulses from the central office through the inward dialing and transfer trunk circuit, to a specific PBX extension, the answering party thereat may initiate a transfer action by flashing his hookswitch, which is effective to operate a signal device at the operator's position. When the PBX operator has been informed of the details of the desired transfer, the recipient of the original call may retire from the connection thereby releasing the local PBX switching circuits. Thereafter, the PBX operator may reseize the PBX switching circuits and extend the incoming call to any other desired PBX extension in response to the dialing of the appropriate digits. As in the case of the call which was in-dialed to the operator, a transmission connection will be completed between the trunk line and the desired PBX extension in response to the disconnect of the operator's circuit from the trunk circuit. Additional transfers may be completed in the manner just described.

The trunk circuit at the PBX is arranged to pass answer supervision back to the central office but to inhibit any other supervisory signals from being sent to the central office except for disconnect supervision.

In addition to the above, further objects and advantages of the invention will become apparent as the following description proceeds, and features of novelty which characterize the invention will be pointed out in particularly in the claims annexed to and forming a part of this specification.

For a better understanding of the invention, reference may be had to the accompanying drawings which comprise five figures on four sheets.

FIG. 1 shows a block diagram of a telephone system incorporating the present invention, FIGS. 2–4 show the details of a circuit incorporating the present invention, and FIG. 5 shows how FIGS. 2–4 should be arranged to show the invention.

It is to be understood that only the details of the circuit necessary to understand the invention have been shown. For example, selector and connector circuits which are well known in the art are shown herein in block diagram form only since the circuit details thereof form no part of the present invention. While only one selector is shown, it is to be understood that any number of selectors could be used between the trunk circuit and the connectors for larger systems.

For convenience in understanding this invention, symbols and terminology which are conventional in the telephone art are employed. For example, the operating coils of all relays are shown as simple rectangles and the contacts associated with each relay are shown in a vertical line either above or below the representation of the coil. All swingers, or straight line portions of the contacts should be thought of as moving towards their respective coils when the relay operates. In conventional telephone systems, the positive side of the power system is grounded and, accordingly, all connections to the positive terminal are designated (+) in the drawings and will be referred to hereinafter as ground. In a similar manner, the connections to the negative terminal of the power supply are designated (−) and are referred to as battery.

It is believed that the operation of the system can best be understood by tracing the extension and transfer of a call through the system. For this purpose, assume that a subscriber served by the equipment in the central office, not shown, seizes central office trunk 110 for extending a call to the PBX shown in block diagram form in FIGURE 1. Seizure of outgoing trunk 110 at the central office is effective to seize the PBX inward dialing and transfer trunk 130 over trunk line 120. Trunk circuit 130 closes a loop to incoming selector 140. In a manner that is well known in the telephone switching art, selector 140 may be used to seize an appropriate connector, such as connector 150; and connector 150 may by directive impulses, originated by the calling subscriber, be directed to signal a selected PBX extension, such as A, B or C, through line circuits 160, 170 or 180, respectively.

The above-described operation serves admirably when the calling subscriber at the central office knows the directory number of the station at the PBX. However, if the station number is not known, or if there is a need to transfer the call from one station to another, additional facilities and features are required.

The present invention provides a means for signaling the PBX operator without utilizing any PBX switching circuits and permits the operator to extend the call to any PBX station without tying-up a cord circuit. In prior systems, a call directed to the PBX operator would be routed to the operator from a particular level of the incoming selector. In the present system, an incoming call which is directed by dialing impulses to the operator will cause the incoming selector to place a marking signal on the LM2 lead to the inward dialing and transfer trunk circuit 130 which releases the selector and will light the line lamp 196 at the operator's position 190 after the proper number of directory digits have been dialed. In response to the illumination of line lamp 196, the operator plugs the rear termination of a cord circuit into answering jack 194 whereupon she may talk with the subscriber at the central office who originated the call. After determining with whom the central office subscriber wishes to talk, the operator may plug the front termination of the cord circuit into calling jack 192 which is effective to place the central office line in hold and causes the inward dialing and transfer trunk 130 to seize incoming selector 140 to be controlled by the operator. After dialing the number of the required PBX extension, the operator may withdraw the cord circuit terminations from the jacks, and the central office and the PBX parties may talk through circuits which are then independent of the operator's position and cord circuit.

If it is necessary for an inward dialed call, or one which has been extended by an operator, to be transferred to another PBX station, the party at the PBX station may cause line lamp 196 at the operator's position to flash in response to a conventional hookswitch operation. When the operator answers by plugging into answer jack 194, a three way conversation between the central office party, the operator, and the PBX party is possible. When the operator has received instructions, the PBX party may disconnect and the operator may plug her cord circuit into the call jack to release incoming selector 140 and connector 150 and reseize incoming selector 140 for use in extending the call to any other PBX station. As before, after the operator has established the connection to the desired extension, the cord circuit may be removed.

It is believed that the details of the operation of the invention can best be understood from the following description if the foregoing summary of operation is kept in mind. The following types of calls or operation will be described in turn:

(1) Inward dialed call to PBX extension;

(2) Inward dialed call to PBX operator;

(3) Extension of a call from the PBX operator to a PBX extension; and (4) Signaling the PBX operator from a PBX extension to initiate a transfer.

*Detailed description*

Figures 1, 5:
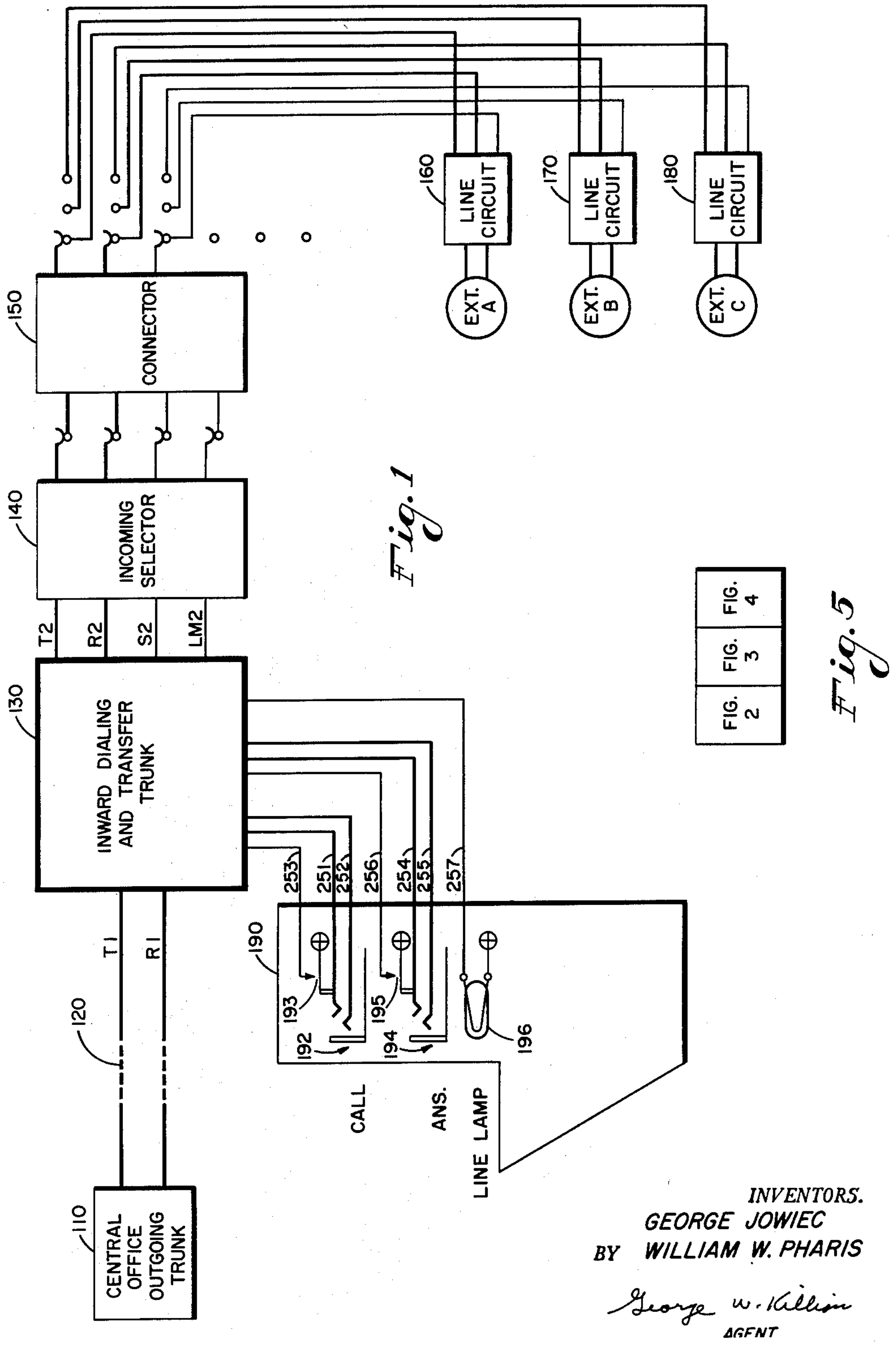
Figure 2:
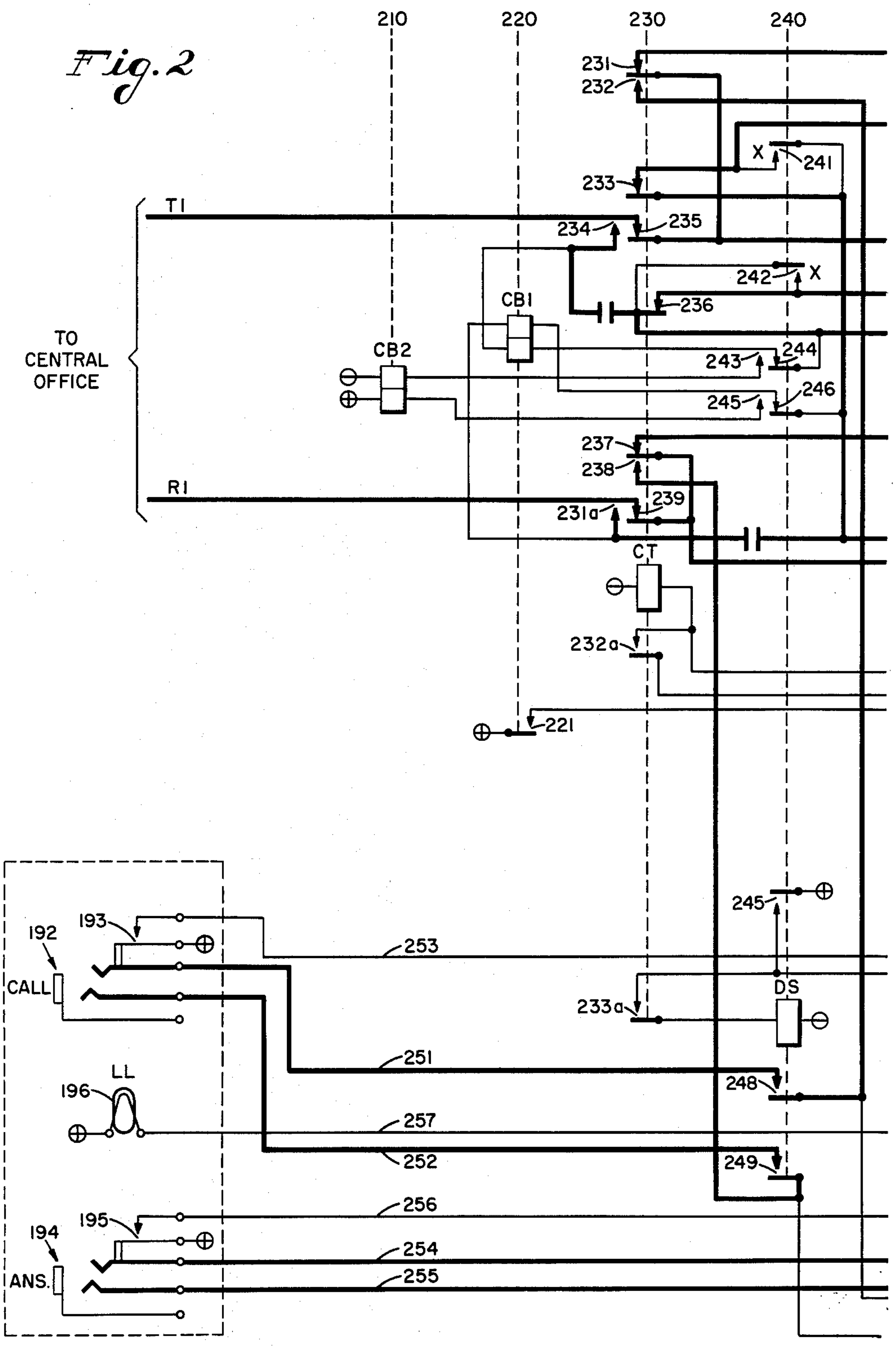
Figure 3:
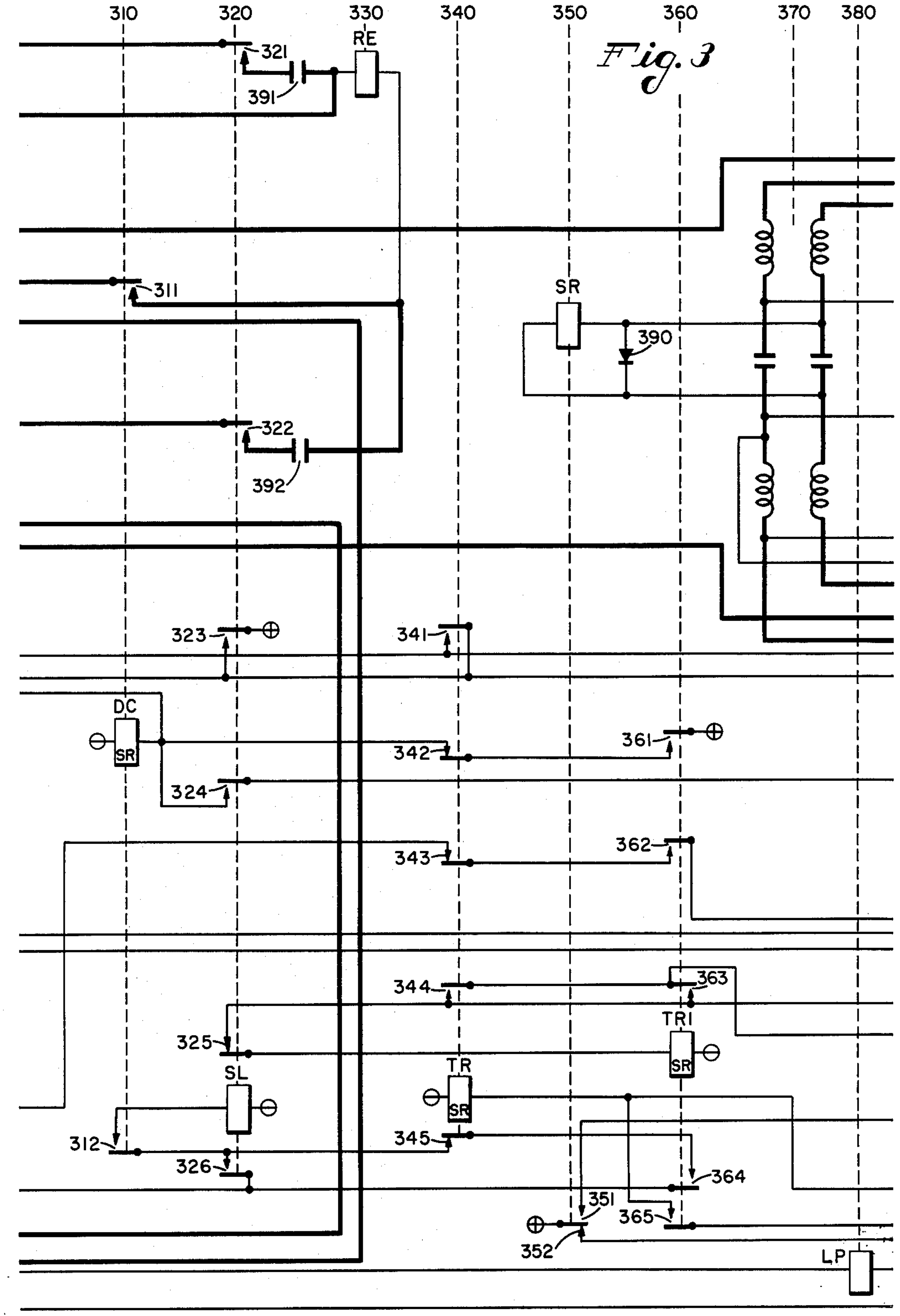
Figure 4:
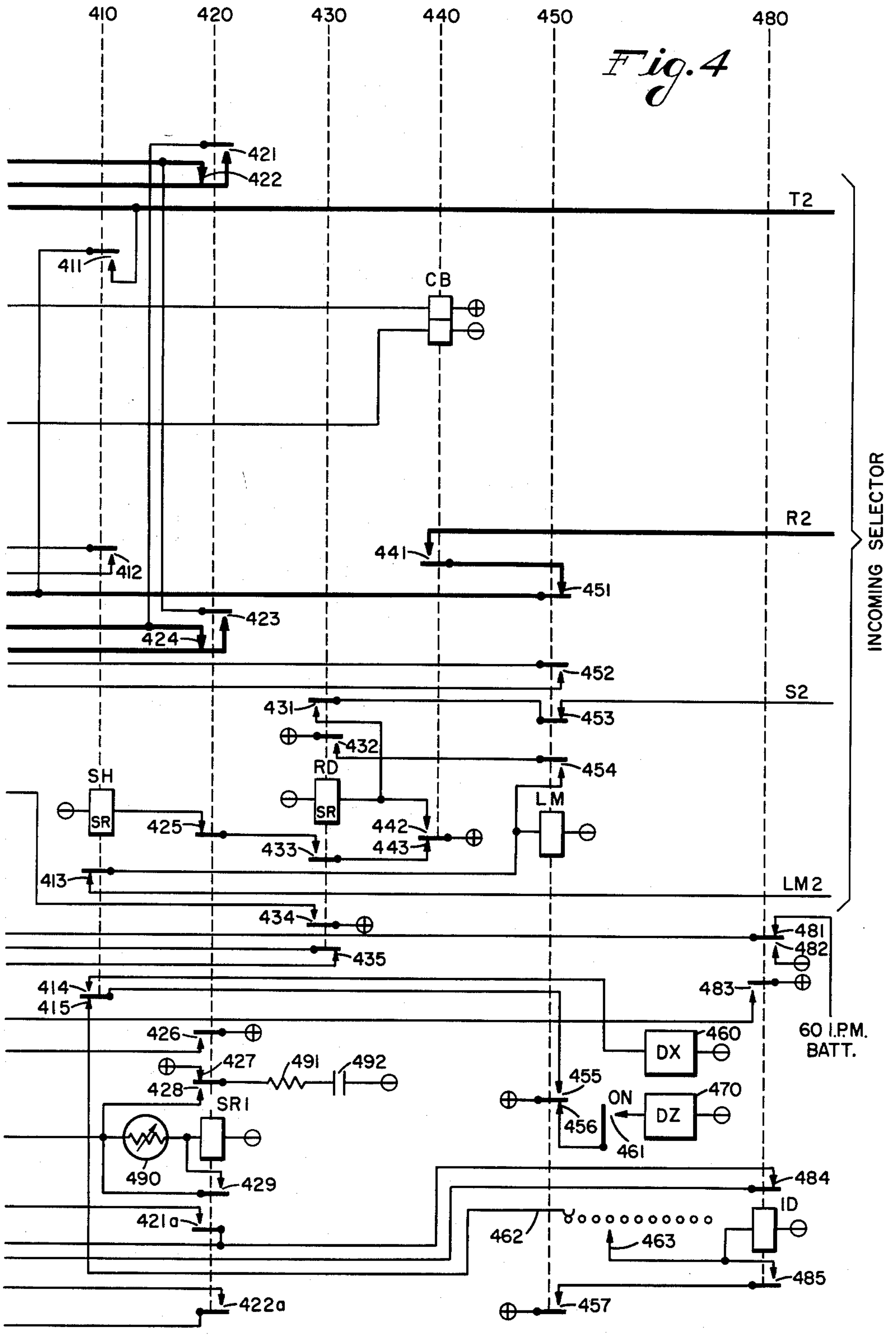

*Inward dialed call to PBX extension.*—A call is incoming to the PBX will close a loop across leads T1 and R1 which, as may be seen by examining FIGURES 2, 3 and 4, is effective to operate relay 440. The circuit is from ground at the winding of relay 440 through the upper left winding or repeat coil 370, normal contacts 422 and 235 to lead T1, through the loop and back on lead R1, normal contacts 239 and 424, the lower left winding of repeat coil 370 and to battery at relay coil 440. The operation of relay 440 closes contacts 441 which are effective to close a loop from T2 to R2 to seize incoming selector 140. The loop circuit is from T2 through the upper right winding of repeat coil 370, relay 350 and shunting diode 390 in parallel, the lower right winding of repeat coil 370, and contacts 451 and 441 to lead R2. The closing of the loop across T2 and R2 is effective to size incoming selector 140 in the well known manner. In addition, the operation of relay 440 closed contacts 442, thereby closing a circuit to relay 430 which operates to open and close the various contacts associated with it, none of which are effective to complete any circuits at this time, with the exception of contact 431 which provides a circuit to hold relay 430 as long as incoming selector 140 returns ground on the S2 lead through closed contacts 453 and 431.

The central office subscriber who has already dialed certain digits to advance the call to this point will continue to dial and in response to each additional digit dialed, relay 440 will pulse a number of times corresponding to the value of the digit dialed. The release of relay 440 during the first pulse of each digit closes a circuit from ground at contacts 443 through contacts 433 and 425 to operate relay 410, whose contacts 411 and 412 are effective to shunt the right-hand sections and the lower left section of repeat coil 370, respectively. After each digit, relay 410 releases at the end of its slow release time.

When the required number of digits have been dialed, connector 150 will signal the station corresponding to the number dialed and the connector will return reverse battery answer supervision to the inward dialing and transfer circuit 130 when the call is answered. The reverse battery supervision is effective to operate supervisory relay 350 which had not been operated previously as diode 390 was an effective shunt across the coil. The operation of relay 350 closes contacts 351 thereby completing a circuit to relay 420 through thermistor 490 which delays the operation of relay 420. Contacts 421 to 424 of relay 420 are effective to reverse the flow of current through leads T1 and R1 thereby returning reverse battery answer supervision to the central office. Momentary flashing of the hookswitch at the called PBX station has no further effect on supervision to the central office as relay 420 will be held operated for a period of time covering a hookswitch flash by the energy stored in capacitor 492 which was maintained charged from ground through contacts 427 and resistor 491. Contacts 428 connect the charged capacitor 492 in parallel with relay 420 and the capacitor is maintained charged from ground at contacts 351. Contacts 429 are effective to shunt thermistor 490.

Conversation may now take place between the central office subscriber and the party at the PBX station. The relays operated are: pulsing relay 440, control relay 430, and supervisory relays 350 and 420.

*Inward dialed call to PBX operator.*—An incoming call directed to the PBX operator will cause inward dialing and transfer trunk 130 and incoming selector 140 to be seized in the same manner as when an inward dialed call was directed to a specific PBX extension. Thus, upon seizure, relays 440 and 430 of the inward dialing and transfer trunk 130 are operated. Incoming selector 140 is arranged to respond to the dialing of a predetermined digit by returning a ground marking on the lead LM2 which will be effective to operate relay 450 at the conclusion of the train of pulses and when relay 410 releases at the end of the digit and closes contacts 413. The operation of relay 450 opens contacts 451 which are effective to open the loop across T2 and R2 thereby releasing incoming selector 140. Contacts 454 of relay 450 are effective to hold relay 450 operated from ground at contacts 432. As before, relay 410 will be operated at the start of each digit dialed by the central office party. Each time that relay 410 operates, thereby closing contacts 414, a circuit will be completed from ground at contacts 455 through contacts 414 to operate stepping magnet 460. Each operation of the stepping magnet advances wiper 462, which is thereby advanced one step for each additional digit dialed. Lead 463 is wired to a terminal of the banks of the stepping switch corresponding to the number of digits to be dialed after relay 450 operates. When the proper number of digits have been dialed and wiper 462 has been advanced to complete a connection to lead 463, relay 480 will be operated from ground at contacts 455 through contacts 415, wiper 462 and lead 463 to battery at the coil of relay 480. Relay 480 closes contacts 485 to lock itself operated under control of ground at contacts 457. Contacts 483 furnish a ground through contacts 325 to operate relay 360. In response to the operation of relay 360, contacts 361 close to complete a circuit through contacts 342 to operate relay 310. Battery at contacts 482 is forwarded through contacts 362 and 343 and lead 257 to light line lamp 196 at the operator's position.

In response to the line lamp signal, the operator will plug the rear termination of an idle cord circuit, not shown, into answering jack 194 thereby closing contacts 195 to forward ground on lead 256 and through contacts 364, 345 and 312 to sleeve relay 320, which operates. Ground at operated contacts 323 of relay 320 forwards a ground through contacts 452 to operate relay 230, which locks itself operated through contacts 232a and under control of contacts 323. Contacts 234, 235, 239 and 231a of relay 230 are effective to provide reverse battery supervision from the PBX to the central office, and to switch the central office loop from pulsing relay 440 to leads 254 and 255 at answering jack 194 and a battery feed relay in the cord circuit. The T1 lead from the central office completes a circuit through contacts 234, the lower winding of relay 220 and contacts 244 to lead 255 which is connected to the negative side of a battery feed relay in the cord circuit. The R1 lead from the central office completes a circuit through contacts 231a and the upper winding of relay 220 and contacts 246 to lead 254 which is connected to the positive side of a battery feed relay in the cord circuit. Relay 220 operates in response to the flow of current through its windings in the circuits just traced. In response to the operation of relay 320, which was operated when the operator plugged into the answering jack, contacts 325 opened thereby opening the circuit to, and releasing, relay 360. Relay 440 was released in response to the operation of relay 230 which disconnected the central office loop from relay 440. Relay 430 releases at the end of its slow release time in response to the release of relay 440 which opened contacts 442. The release of relay 430 opens contacts 432 thereby opening the circuit, and releasing relay 450. The release of relay 450 closed contacts 456 thereby completing a circuit through off-normal contacts 461 of the stepping switch to energize release magnet 470 to restore the stepping switch to its normal position and open contacts 461. Relay 480 will release in response to contacts 457 of relay 450 being opened when relay 450 released. The relays which remain operated are relays 310, 320, 230 and 220. The central office party and the PBX operator are connected together on a transmission basis through the cord circuit. It should be noted that contacts 221 of relay 220 are now effective to hold relay 310 operated. The central office subscriber may now request a connection to any desired PBX extension.

*Extension of a call from the PBX operator to a PBX extension.*—When the operator has determined to whom the central office subscriber wishes to talk, she will plug the front termination of the cord circuit into call jack 192. In response to the closing of contacts 193 of the call jack, a circuit is completed over lead 253 and through contacts 435 and 233a to operate relay 240. The operation of relay 240 is effective to split off the central office subscriber and connect the central office loop to impedance coil 210. The circuit is from ground at impedance coil 210 through contacts 245, the upper winding of relay 220 and contacts 231a to the R1 lead and thence through the central office loop and back on the T1 lead through contacts 234, the lower winding of relay 220 and contacts 243 to battery at the upper winding of impedance coil 210. The operator's cord circuit is effective to close a loop between leads 251 and 252 to operate pulsing relay 440 from ground at the upper winding of relay 440 through the upper left winding of repeat coil 370, contacts 422, 232 and 248 to lead 251 and thence through the cord circuit loop and back on lead 252 through contacts 249, 238 and 424 and the lower left winding of repeat coil 370 to battery at the lower winding of relay 440. Relay 430 operates in response to the closure of contacts 432 on relay 440. As previously explained, the operation of relay 440 is effective to close contacts 441 and close a loop across leads T2 and R2 to seize incoming selector 140. Relay 440 repeats the operator's dial pulses to incoming selector 140. As in the earlier cases, relay 410 operates at the start of each digit and releases at the conclusion of each digit. In this manner, a call may be extended to any desired PBX extension.

As in the case for an inward dialed call directly to a PBX extension, connector 150 returns reverse battery supervision to the inward dialing and transfer trunk in response to answer supervision thereby operating relay 350. The operation of relay 350 closes contacts 351 to operate relay 420 in the same manner that it was operated in the case of an inward dialed call to a PBX extension. The operation of relay 420 closes contacts 427a to connect impedance coil 380 across the loop to relay 440 in order to hold relay 440 if the operator should remove her cord circuit from the call jack before it is removed from the answer jack. The relays that are now operated are relays 310, 320, 220, 240, 440, 430, 350 and 420. The PBX operator is connected to the PBX station on a transmission basis but as previously mentioned, the central office party may be split off so that he cannot hear the conversation between the operator and the PBX extension. If the party at the PBX extension is willing to accept the incoming call, a transmission path will be completed between the central office subscriber and the party at the PBX station in response to the operator removing her cord circuit from the answering and calling jacks. As will be seen, after the operator has removed her cord circuit, the relays operated in the inward dialing and transfer trunk will be identically the same relays as those which were operated at the conclusion of a direct inward dialed call to a PBX extension.

When the operator removes the cord circuit plug from answering jack 194, contacts 195 open and thereby release relay 320. Relay 230 releases in response to the opening of contacts 323 on relay 320. The release of relay 230 is effective to reconnect the central office loop to relay 440 and to release relays 210 and 220 which are no longer connected in the central office loop. The release of relay 230 opened contacts 233a thereby opening the circuit, and releasing relay 240. Relay 310 releases at the end of its slow release time in response to the opening of contacts 221 when relay 220 released. The removal of the other end of the cord circuit from call jack 192 has no further effect on this circuit. The relays which are now operated are relays 440, 430, 350 and 420 which, as previously mentioned, are identically the same relays as those which were operated at the conclusion of an inward dialed call directly to a PBX extension.

*Signaling the PBX operator from a PBX extension to initiate a transfer.*—The relays which are operated after a call has been inward dialed from a central office subscriber to a PBX extension, or after the PBX operator has extended a call to a PBX station, are identically the same; namely, relays 440, 430, 350 and 420. If it is necessary for a party at the PBX extension to initiate a transfer, he may signal the operator by slowly depressing and releasing the hookswitch of his telephone which is effective to release and reoperate supervisory relay 350. In response to the momentary release of relay 350, relay 340 will be operated from ground at contacts 352 through contacts 484 and 421a to battery at relay 340. The closing of contacts 344 on relay 340 completes a circuit from ground at contacts 426 through contacts 344 and 325 to operate relay 360. Relay 420 did not release during the momentary hookswitch flash as the energy stored in capacitor 492 was sufficient to maintain relay 420 operated. The reoperation of relay 350 at the end of the hookswitch flash opens contacts 352 thereby releasing relay 340. However, relay 360 does not release as contacts 363 in parallel with contacts 344 provide an alternate path to maintain relay 360 operated. In response to the release of relay 340, ground from contacts 361 is forwarded through contacts 342 to operate relay 310. Contacts 311 on relay 310 are effective to complete a circuit from lead 254 through contacts 233, retard coil 330, contacts 311 and 236 to lead 255 at the answering jack. Also in response to the release of relay 340, a circuit is completed from 60 i.p.m. battery through contacts 481, 362 and 343 to line lamp 196 thereby causing the line lamp to flash. The operator will respond to the flashing lamp by inserting the rear termination of an idle cord circuit in the answering jack 194 which closes contacts 195 to complete a circuit through contacts 364, 345 and 312 to operate relay 320 which closes an alternate holding path to itself through contacts 326. The opening of contacts 325 on relay 320 is effective to open the circuit to relay 360 which releases at the end of its slow release time and opens contacts 362 to disconnect the line lamp from the 60 i.p.m. source. Relay 320 closes contacts 324 to provide an alternate holding circuit for relay 310 with ground from contacts 434. The central office subscriber, the PBX operator, and the party at the PBX extension are now connected on a transmission basis. The central office party is connected to a transmission birdge circuit including relay 440; the PBX party receives transmission battery from connector 150 and is inductively coupled, on a transmission basis, to the central office party by means of repeat coil 370, while the operator is capacitively coupled into the circuit through capacitors 391 and 392. The circuit may be traced from lead T1 through contacts 235, 231, 321, capacitor 391, retard coil 330, capacitor 392, contacts 322, 237 and 239 to lead R1. Retard coil 330 is in the following D.C. circuit to the operator's cord circuit: from lead 254, contacts 233, retard coil 330, contacts 311 and 236 to lead 255. The relays operated are relays 440, 430, 350, 420, 310 and 320.

After the operator has been advised to whom the call should be transferred, the party at the PBX extension may disconnect thereby releasing relay 350 whose contacts 352 will close a previously traced circuit to operate relay 340. Ground from contacts 323 will be forwarded through contacts 341 to operate relay 230 which locks itself operated through contacts 232a under control of ground at contacts 323. The opening of contacts 231 and 237 and the subsequent closing of contacts 232 and 238 on relay 230 are effective to disconnect relay 440 from the central office loop and connect it in series with impedance coil 380. The circuit is from ground at relay 440 through the upper left winding of impedance coil 370, contacts 422 and 232, through impedance coil 380 and contacts 422a, 238 and 424 and the lower left winding of impedance coil 370 to battery at the lower winding of relay 440. The central office loop, which was disconnected from relay 440, was switched through to leads 254 and 255 at the answering jack in response to the operation of relay 230. The circuit may be traced from lead 254, through contacts 246, the upper winding of relay 220, contacts 231a to lead R1 and through the central office loop and back on lead T1, through contacts 234, the lower winding of relay 220 and contacts 244 to lead 255. In response to the flow of current through the circuit just traced, relay 220 will operate to close contacts 221 providing an alternate holding circuit to relay 310. Relay 420 will be released when there is no longer sufficient energy stored in capacitor 492 to hold it operated. The release of relay 420 opens contacts 422a thereby opening the loop to relay 440, which releases. In addition, the release of relay 420 opened contacts 421a to release relay 340. Relay 430 is released at the end of its slow release time in response to the opening of contacts 442.

After the operator has been given instructions for extending the call to another PBX extension, and the original PBX party has disconnected, the operator will insert the front termination of her cord circuit into the calling jack 192. The closing of contacts 193 on calling jack 192 will complete a circuit through contacts 435 and 233a to operate relay 240 which locks itself operated through contact 245 and under the control of contacts 233a. It should be noted that relay 240 could not have been operated prematurely by having the operator insert the plug into the calling jack before the release of relay 430 as the circuit to operate relay 240 cannot be completed until relay 430 has released. The operation of relay 240 is effective to close a loop from the operator's cord circuit to relay 440. The circuit may be traced from ground at relay 440, through the upper left winding of repeat coil 370, through contacts 422, 232 and 248 to lead 251 and thence through the loop at the cord circuit and back on lead 252 and through contacts 249, 238 and 424 and through the lower left winding of repeat coil 370 to the batter at the lower winding of relay 440. The operation of make-before-break contacts 243–246 on relay 240 are effective to shift the central office loop from leads 254 and 255 to impedance coil 210. The circuit may be traced from ground at impedance coil 210, through contacts 245, the upper winding of relay 220, contacts 231a, through the central office loop, contacts 234, the lower winding of relay 220 and contacts 243 to battery at the upper winding of impedance coil 210. This circuit is effective to permit the operator to disconnect the central office subscriber from the transmission circuit that will be completed between the operator and the PBX party. The loop to the cord circuit is maintained when relay 240 operated by substituting retard coil 330 for the central office loop. The circuit is from lead 254 through preliminary make contacts 241 (designated "X"), retard coil 330, contacts 311 and preliminary make contacts 242 to lead 255. The reoperation of relay 440 was effective to reoperate relay 430 and to close the loop to incoming selector 140. The operator may extend the call to the desired PBX extension by directive impulses from her dial. When the party at the PBX station answers, supervisory relays 350 and 420 will be operated in the manner previously described. The PBX operator may advise the party at the PBX extension that a call from a central office subscriber is being transferred to that extension and, if the PBX party is willing to accept the call, the central office subscriber and the PBX extension will be connected on a transmission basis in response to the operator removing the cord circuit from the call and answer jacks. The removal of the cord circuit from the anwser jack opens the circuit to relay 320 which releases, thereby opening contacts 323 to release relay 230. The loop to hold relay 440 is once again shifted to the central office loop. Relays 240 and 220 release in response to the release of relay 230. Relay 310 releases in response to the release of relay 220. The relays which remain operated at this time are 440, 430, 350 and 420 which, as previously mentioned, are identically the same relays that are operated at the conclusion of an inward dialed call or after the extension of a call to a PBX extension. Therefore, any number of additional transfers may be made as may be required. Had the operator disconnected the cord circuit from the call jack before the cord circuit was disconnected from the answering jack, impedance coil 380 would be effective to hold relay 440 until the cord circuit is withdrawn from the answering jack to release relay 320 and reconnect the central office loop to relay 440.

In summary, there has been shown and described a telephone system which permits inward dialed calls to a PBX extension or to an operator and which permits transfer of calls which have been inward dialed to a PBX extension under control of an operator without requiring the use of an operator's cord circuit after a transfer or extension has been completed.

While there has been shown and described what is considered at present to be the preferred embodiment of the invention, modifications thereto will readily occur to those skilled in the art. It is not desired, therefore, that the invention be limited to the specific embodiment shown and described, and it is intended to cover in the appended claims all such modifications as fall within the true spirit and scope of the invention.

What is claimed is:

1. In a telephone system, the combination comprising a central office, a PBX and a trunk line interconnecting said central office and said PBX, wherein said PBX includes a trunk circuit terminating said trunk line which is seized by a call extended thereto over said trunk line from said central office, a plurality of PBX extensions each having a different designation number, an operator's position having a designation number, a switch train for extending a connection which is independent of said operator's position from said trunk circuit to any particular one of said PBX extensions in response to directive signals manifesting the designation number of said particular one of said PBX extensions being applied thereto, coupling means in said trunk circuit for connecting said switch train to said trunk line, said operator's position including indicating means, means for operating said indicating means in response to directive signals manifesting the designation number of said operator's position being received by said trunk circuit over said trunk line from said central office, first means selectively connectable by said operator for coupling said operator's position to said coupling means in said trunk circuit to establish a communication path from said operator's position to said central office over said trunk line, second means selectively connectable by said operator for applying directive signals manifesting any particular one of said PBX extensions to said switch train for extending a connection from said coupling means to said particular one of said PBX extensions, and means independent of said operator's position for maintaining said extended connection through said switch train to said particular one of said PBX extensions, whereby said connection to said particular one of said PBX extensions will remain extended after said first and second means have been disconnected by the operator.

2. The combination defined in claim 1, wherein said trunk circuit includes holding means and control means coupled to said coupling means for disconnecting said switch train from said trunk line and connecting said holding means to said trunk line in response to the connection of said second means by said operator to thereby break said communication path between said operator's position and said central office while holding said trunk circuit seized by said call from said central office and permitting said first means when connected to establish a communication path between said operator's position and said particular one of said PBX extensions after said connection thereto from said coupling means has been extended, said control means being responsive at least in part to the disconnection of said second means by said operator after said connection between said coupling means and said particular one of said PBX extensions has been extended by said switch train for reconnecting said switch train to said trunk line to permit a communication path between said particular one of said PBX extensions and said central office to be established.

3. The combination defined in claim 2, further including means coupled to said control means and responsive to both the connection of said first means by said operator and the extension of said connection between said particular one of said PBX extensions and said trunk circuit by said switch train for maintaining said switch train disconnected from said trunk line, whereby said control means reconnects said switch train to said trunk line only in response to both said first and second means being disconnected by said operator.

4. The combination defined in claim 1, wherein each of said PBX extensions has an off-hook condition and an on-hook condition, and means independent of said switch train for operating said indicating means of said operator's position in response to a flashing between its off-hook and on-hook conditions of said particular one of said PBX extensions to which a connection has been extended from said coupling means by said switch train, whereby the connection of said first means by said operator establishes a communication path between said particular one of said extensions and said operator's position, and means responsive to an on-hook condition lasting greater than a given period immediately following an off-hook condition of said particular one of said PBX extensions after said first means has been connected by said operator for restoring said switch train while holding said trunk circuit seized by said call from said central office, whereby the operator by connection of said second means may after the restoration of said switch train apply directive signals manifesting the designation number of any given one of said PBX extensions to said switch train to thereby extend a connection between said trunk circuit and said given one of said PBX extensions.

5. The combination defined in claim 4, wherein the designation number of said operator's position is different from the respective designation numbers of said plurality of PBX extensions and means independent of said operator's position in said trunk circuit for applying directive signals manifesting the designation number of any particular PBX extension received over said trunk line from said central office to said switch train to extend a connection from said coupling circuit to said particular one of said PBX extensions, whereby said switch train may extend a connection between said coupling means and said particular one of said PBX extensions in response to directive signals manifesting the designation number of said particular one of said PBX extensions being applied thereto either by said second means when connected by said operator or alternatively by said trunk circuit receiving said directive signals over said trunk line from said central office.

References Cited by the Examiner

UNITED STATES PATENTS

| | | | |
|---|---|---|---|
| 2,567,190 | 9/51 | Deakin | 179—27 |
| 2,976,368 | 3/61 | Gray | 179—27 |
| 2,993,095 | 7/61 | Arnold | 179—27 |
| 3,033,938 | 5/62 | Young | 179—27 |
| 3,041,406 | 6/62 | Killian | 179—27 |
| 3,102,930 | 9/63 | Anderson | 179—26 |

ROBERT H. ROSE, *Primary Examiner.*

WALTER L. LYNDE, L. MILLER ANDRUS, *Examiners.*